United States Patent
Copeland

(10) Patent No.: US 11,823,531 B1
(45) Date of Patent: Nov. 21, 2023

(54) PROOF OF PLAY BLOCKCHAIN MINING

(71) Applicant: GAD Research, LLC, Dallas, TX (US)

(72) Inventor: William Blake Copeland, Dallas, TX (US)

(73) Assignee: GAD Research, LLC, Dallas, TX (US)

( * ) Notice: Subject to any disclaimer, the term of this patent is extended or adjusted under 35 U.S.C. 154(b) by 15 days.

(21) Appl. No.: 17/736,991

(22) Filed: May 4, 2022

(51) Int. Cl.
*G07F 17/32* (2006.01)
*G06Q 10/10* (2023.01)
*H04L 41/00* (2022.01)
*H04L 9/32* (2006.01)

(52) U.S. Cl.
CPC ....... *G07F 17/3244* (2013.01); *G06Q 10/103* (2013.01); *G06Q 2230/00* (2013.01); *H04L 9/3236* (2013.01); *H04L 41/30* (2013.01)

(58) Field of Classification Search
CPC .............. G07F 17/3244; G06Q 10/103; G06Q 2230/00; H04L 9/3236; H04L 41/30
See application file for complete search history.

(56) References Cited

U.S. PATENT DOCUMENTS

| | | | | |
|---|---|---|---|---|
| 10,198,901 | B1 * | 2/2019 | Wakeford | A63F 13/79 |
| 2009/0054123 | A1 * | 2/2009 | Mityagin | A63F 13/23 |
| | | | | 463/9 |
| 2013/0079075 | A1 * | 3/2013 | Osvald | A63F 13/87 |
| | | | | 463/7 |
| 2014/0164037 | A1 * | 6/2014 | Rao | G06Q 30/0207 |
| | | | | 705/7.13 |
| 2015/0087426 | A1 * | 3/2015 | Schulz | G07F 17/3255 |
| | | | | 463/43 |
| 2016/0330034 | A1 * | 11/2016 | Back | G06Q 20/065 |
| 2018/0025435 | A1 * | 1/2018 | Karame | G06Q 20/02 |
| | | | | 705/30 |
| 2019/0109707 | A1 * | 4/2019 | Ajoy | H04L 9/0637 |
| 2020/0134066 | A1 * | 4/2020 | Yegorin | G06F 16/2379 |
| 2020/0311790 | A1 * | 10/2020 | Keren | G06Q 20/0655 |
| 2021/0065505 | A1 * | 3/2021 | Rousseau | G07F 17/3211 |
| 2021/0073749 | A1 * | 3/2021 | Sanford | G06Q 20/349 |
| 2021/0082044 | A1 * | 3/2021 | Sliwka | H04L 9/3255 |

OTHER PUBLICATIONS

Ankit Goyal Monika et al., Atomic Cross-Chain Asset Exchange for Ethereum Public Chains, Apr. 12, 2021, IEEE, pp. 1-4 (Year: 2021).*
Blessing Ngonidzashe Musungate et al., Sidechains: Highlights and Challenges, Jan. 2, 2020, IEEE, pp. 1-5 (Year: 2020).*

* cited by examiner

*Primary Examiner* — Nilesh B Khatri
(74) *Attorney, Agent, or Firm* — Fish & Richardson P.C.

(57) ABSTRACT

Methods, systems, and apparatus, including computer programs encoded on computer-storage media, for proof of play (PoP) blockchain mining. In some implementations, a corresponding method may include providing a set of one or more task parameters for a group task to each of two or more users; responsive to a consensus among the two or more users, storing a start-task transaction that includes the set of one or more task parameters signed by each of the two or more users; storing an end-task transaction at an address of a blockchain; determining respective rewards for at least a subset of the two or more users based at least on the start-task transaction and the end-task transaction; and recording the respective rewards in the blockchain.

21 Claims, 3 Drawing Sheets

PROOF OF PLAY BLOCKCHAIN MINING

FIELD

This specification generally relates to blockchain mining.

BACKGROUND

Currency corresponding to blockchains can be mined in a few different ways. The two most common ways are Proof of Work (PoW) and Proof of Stake (PoS). PoW requires both time and energy to mine a block by solving a cryptographic problem. Fraudulent blocks will be rejected and actual money can be lost in the form of the energy bill for the failed mining effort. In PoS, users stake existing coin in order to mine. If a user approves fraudulent transactions, the network will remove the stake provided by the user. Actual money is similarly lost in the form of the value of the stake.

SUMMARY

In some implementations, a system for proof of play (PoP) blockchain mining includes connecting devices of two or more users on a platform for engaging in a group project, game, match, or another endeavor (referred to as "a group task" or simply a "task"). The group task can involve two or more participants, players, or users (referred to as "users"). The group task can be a collaborative, competitive, or another type of task among the multiple users. The platform can be configured to allow data exchange between the devices of the two or more users. Before starting the task, the two or more users can cryptographically sign a start-task transaction and record the start-task transaction in a block of a blockchain. During the task, task data can be generated by each of the two or more users engaging in operations of the task. A controlling device can be selected by a device implementing the platform or one or more devices of the blockchain to record the task data in a side chain cryptographically signed by the controlling device. The controlling device can provide the recorded task data to the blockchain. Based on the recorded task data, the two or more users can receive rewards, for example, in terms of cryptocurrency such as Bitcoin or Ether, traditional fiat currencies such as dollars, or another type of fungible or non-fungible assets such as coins, tokens, or credits, indicating their participation in the task.

One innovative aspect of the subject matter described in this specification is embodied in a method that includes providing, by one or more processing devices, a set of one or more task parameters for a group task to each of two or more users; responsive to a consensus among the two or more users, storing a start-task transaction that includes the set of one or more task parameters signed by each of the two or more users in accordance with a cryptographic process; storing an end-task transaction at an address of a blockchain, the address of a blockchain being independent from the two or more users, where the end-task transaction includes task data associated with actions taken during execution of the task by the two or more users; determining respective rewards for at least a subset of the two or more users based at least on the start-task transaction and the end-task transaction; and recording the respective rewards in the blockchain.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include selecting, by the one or more processing devices, a controlling user, where a user device associated with the controlling user obtains the task data and generates the end-task transaction, and where a stake reward is associated with the controlling user.

In some implementations, actions include storing, at the address of the blockchain, one or more data items indicating disputes associated with actions taken by the controlling user; and removing the stake reward from an account address of the controlling user.

In some implementations, actions include obtaining data corresponding to one or more blocks of the blockchain; and determining, based on the obtained data, that account addresses of the two or more users are valid.

In some implementations, actions include obtaining data corresponding to one or more blocks of the blockchain; determining, based on the obtained data, that at least one of the two or more users is participating in another group task; and responsive to determining that at least one of the two or more users is participating in another group task, preventing the at least one of the two or more users from being rewarded from both group tasks.

In some implementations, actions include obtaining an account address and an identifier of a user of the two or more users; providing the account address and the identifier of the user to the blockchain; obtaining one or more votes indicating an approval or denial of the user; and recording, based on the one or more votes, the account address of the user as a verified address.

In some implementations, actions include determining a percentage number of votes indicating approval or denial of the user based on the one or more votes; and recording, based on the percentage number of votes, the account address of the user as the verified address.

In some implementations, actions include determining a verified address for each user of the two or more users before generating the start-task transaction.

In some implementations, the address of the blockchain represents an account address on the blockchain.

In some implementations, the address of the blockchain is determined by a node of the blockchain based on a hash value of the start-task transaction.

In some implementations, actions include generating, by the one or more processing devices, a connected group of the two or more users for completing the group task through an online service.

In some implementations, each of the two or more users correspond to an account address, and recording the respective rewards in the blockchain includes: recording one or more values indicating a portion of the respective rewards to each account address corresponding to each of the users in the subset.

In some implementations, determining the respective rewards for at least the subset of the two or more users based at least on the start-task transaction and the end-task transaction includes: determining the respective rewards for at least two of the two or more users based at least on time of the at least two of the two or more users spent on the group task.

In some implementations, the set of one or more task parameters are signed by a device of a controlling user and the device obtains the task data and generates the end-task transaction.

In some implementations, actions include receiving, by the one or more processing devices, the task data associated with actions taken during execution of the task by the two or more users.

In some implementations, actions taken during execution of the task by the two or more users include virtual actions taken by the two or more users within a virtual game environment.

The details of one or more embodiments described in the application are set forth in the accompanying drawings and the description below. Other features and advantages of the embodiments will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
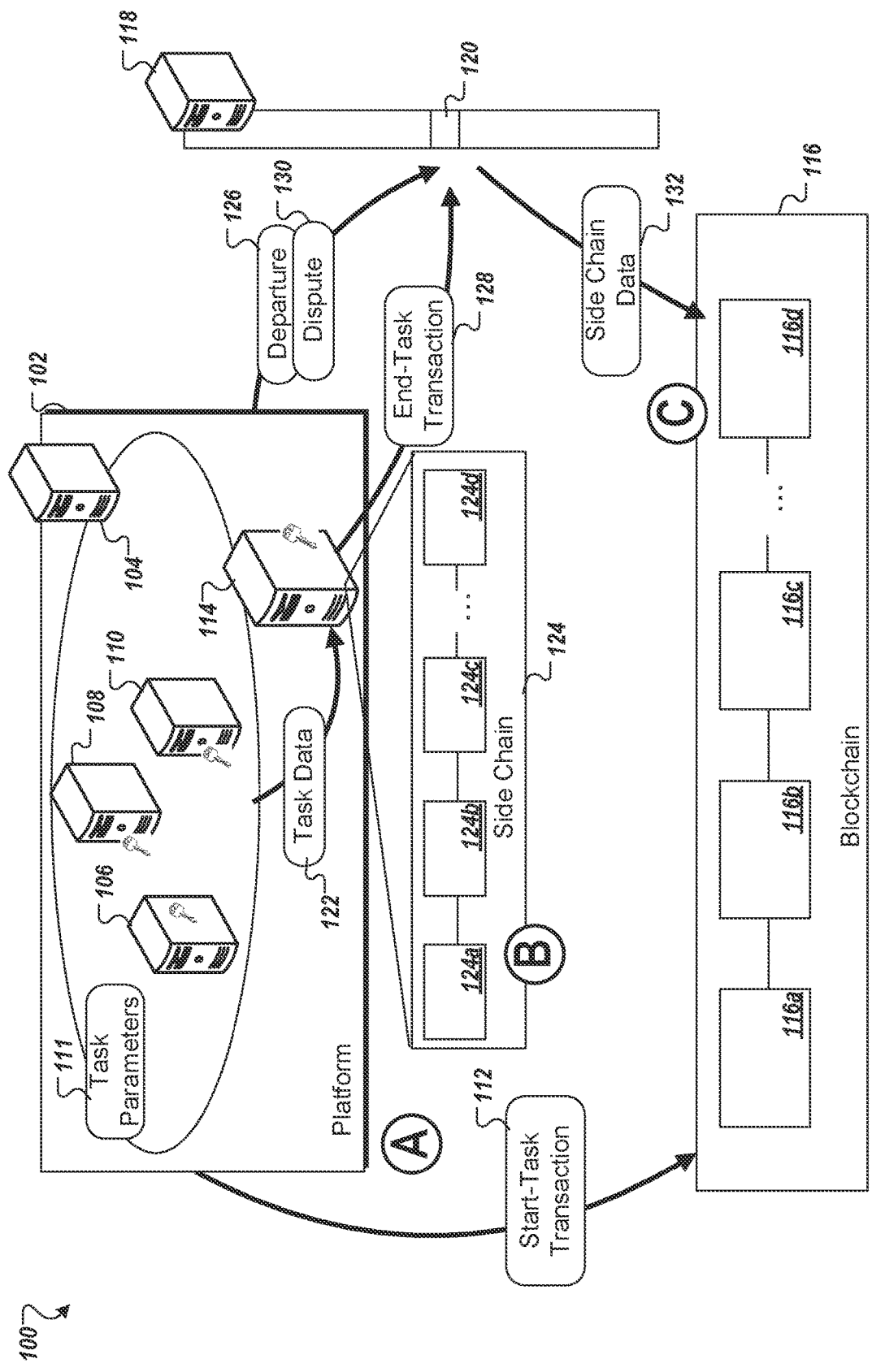
FIG. 1 is a diagram showing an example of a system for proof of play (PoP) blockchain mining for providing rewards based on participation of multiple users in a group task.

FIG. 1 is a diagram showing an example of a system 100 for proof of play (PoP) blockchain mining for providing rewards based on participation of multiple users in a group task. The system 100 includes a platform 102, a platform device 104 operating the platform 102, user devices 106, 108, and 110 operable to send data to one another directly or over the platform 102, a controlling device 114 that stores task data 122 in a side chain 124, a blockchain 116 that records data from the group task, and a storage device 118 representing an address 120 of blockchain 116 used to store data from the group task. The system 100 can included additional or different devices or components.

In some implementations, the platform 102 provides a connected lobby or online platform that allows data to be transmitted between the user devices 106, 108, and 110. For example, the platform 102 can provide a data connection between each of the user devices 106, 108, and 110. The data connection can be made over public or private networks using wired or wireless connections, according to implementation. In some implementations, the user devices 106, 108, and 110 send data through the platform device 104. In some implementations, the user devices 106, 108, and 110 send data directly to one another.

In some implementations, the user devices 106, 108, and 110 are interacting to complete a task. As an example, the user devices 106, 108, and 110 can interact to perform actions on one or more common projects (e.g., working on a legal document, such as edits, personal signatures, questions, among others). As another example, the user devices 106, 108, and 110 can interact to perform actions within a virtual environment, such as playing a game in a virtual or online environment.

In some implementations, the user devices 106, 108, and 110 can agree on one or more task parameters. The one or more task parameters can represent conditions for each user of the user devices 106, 108, and 110 performing actions to complete the task. For example, task parameters can include a length of time for the task, rules, conditions, such as conditions on abilities of users. Conditions can include signing or editing power of a user, powers or abilities of a user within a game environment, or one or more regulations. Regulations can be specific to a document type or game type, among others. In some implementations, the task parameters can also include an initial settings of the task, such as team names and corresponding team features (e.g., roles, icons, and authorities).

In some implementations, when all the users are ready to start the task and agree with the one or more task parameters, each of the users takes start-task data (also referred to as initial task data) that include the agreed one or more task parameters and signs it. Then each of the users shares the signature with all the other user in the lobby. Likewise, all the other users do the same and locally validate each signature of other users. If all the signatures are valid and exchanged between the users, then one or more of the users can submit the start-task data to the blockchain 116 and start the task. This can be referred to as a start-task transaction. The start-task transaction allows a group of users sign and agree on a set of starting parameters (e.g., the start-task data), reaching a consensus before the task starts. Notably, such a consensus can be performed off the blockchain, before a blockchain transaction (e.g., the start-task transaction) is sent to the blockchain. Such a consensus can be in addition to the consensus process performed by the blockchain.

In some implementations, in the example shown in FIG. 1, the user devices 106, 108, and 110 perform consensus on the start-task data. For example, the user devices 106, 108, and 110 can perform consensus on the one or more task parameters 111 as well as the participants of the task, such as the user devices 106, 108, and 110. The user devices 106, 108, and 110 each sign a data package including the data of the start-task transaction 112 with a private key. Each of the user devices 106, 108, and 110 can use a different, unique, private key corresponding to a user account or the particular user device of the user.

In some implementations, in stage A, the user devices 106, 108, and 110 provide the start-task transaction 112 signed by each of the user devices 106, 108, and 110 to the blockchain 116. For example, any one of the user devices 106, 108, and 110 can provide the signed start-task transaction 112 to the blockchain 116. If multiple users provide the same start-task transaction 112, a mining node of the blockchain 116 can record a single instance of the start-task transaction 112 in a block, such as one of blocks 116a-d, of the blockchain 116.

In some implementations, the controlling device 114 signs the start-task transaction 112. For example, the controlling device 114 can obtain a unique private key associated with the controlling device 114. The controlling device 114 can use the unique private key to cryptographically sign the start-task transaction 112. In some implementations, by signing the start-task transaction 112, the controlling device 114 becomes a controlling device. Other user devices parsing the start-task transaction 112 can determine, based on the signatures, a corresponding controlling device as well as other information. The controlling device 114 can provide functions of an officiator of one or more group tasks corresponding to the start-task transaction 112. For example, the start-task transaction 112 can be obtained by a device of the blockchain 116. The device can read the start-task transaction 112 and determine, based on the controlling device 114 signing the start-task transaction 112, that the controlling device 114 is the controlling device for the one or more group tasks corresponding to the start-task transaction 112.

In some implementations, in stage A, the user devices 106, 108, and 110 provide start-task data signed by each of the user devices 106, 108, and 110 to the platform device 104. The platform device 104 can send the signed start-task data in the start-task transaction 112 to the blockchain 116.

The start-task transaction 112 can include one or more task parameters 111. The start-task transaction 112 can include the participants of the task, such as the user devices 106, 108, and 110. In a game situation, the start-task transaction 112 can include starting criteria such as what team each user of the user devices 106, 108, and 110 are on. One or more devices operating the blockchain 116 (e.g., one or more blockchain node devices of a blockchain network) can receive the start-task transaction 112, perform consensus on the start-task transaction 112, and add the start-task transaction 112 in a block of the blockchain 116. For example, one or more blockchain nodes devices of the blockchain 116 can add the start-task transaction 112 to the block 116*b*. Blocks 116*a-d* show example blocks of the blockchain 116.

In some implementations, mining methods can be used to generate additional blocks in the blockchain 116. For example, PoS or PoW can be used to generate one or more blocks that record the start-task transaction 112 in the blockchain 116.

In some implementations, each user of the user devices 106, 108, and 110 provides a stake in order to join the group task. For example, a user can provide, through each of the user devices 106, 108, and 110, a stake (e.g., an amount of currency) to the platform 102 or the blockchain 116. The stakes can be used as collateral to ensure fair play by users. The stakes can be given back to the users provided the users "play fair" in completing the task. The stakes can also be used to incentivize participation by awarding a portion of the stakes to one or more users of the user devices 106, 108, and 110 based on the performance of actions during the task. For example, a user that performs more actions or scores more points, or satisfies one or more predetermined criteria, can qualify to receive a portion of the stakes provided by other users of the user devices 106, 108, and 110. In some implementations, providing stakes is a prerequisite for each user of the user devices 106, 108, and 110 for starting the task. For example, the start-task transaction 112 can require and record a stake of each user of the user devices 106, 108, and 110 for the users of the user devices 106, 108, and 110 to participate in the task.

In some implementations, each device of the user devices 106, 108, and 110 validates the signature of the start-task transaction 112. For example, each device of the user devices 106, 108, and 110 can use public keys corresponding to the private keys used by each device to sign the start-task transaction 112. Each device can perform cryptographic operations on the start-task transaction 112. Each device can use the public keys of the other devices to validate the data of the start-task transaction 112, including the one or more task parameters 111.

In some implementations, the platform device 104 is a blockchain node device of the blockchain 116. For example, the platform device 104 can be a blockchain node device that stores the blockchain 116. The platform device 104 can contribute to mining new blocks of the blockchain 116. The platform device 104 can be a consensus node that contributes to performing the consensus process and establishing consensus on the blockchain 116, among other blockchain operations.

In some implementations, each user of the user devices 106, 108, and 110 may need to have a verified address to participate in the group task. A normal address inherent to a blockchain (e.g., a wallet address) is an account address of a user, which cryptocurrency can be sent to or from. A normal address (also referred to as a normal blockchain address) can participate and stake in mining blocks via PoS. A verified address can not only perform functions of the normal address, but also participate in POP. In some implementations, a verified address is tied to a user's unique identifiers (e.g., a name, gamer tag, or ID number). In some implementations, only verified addresses are allowed to participate in PoP.

In some implementations, for an address to be a verified address, a user can post to the blockchain the user's unique identifier, an authentication token proving the user's identity, and an account address (e.g., a normal address) the user wants to tie the user's identity to. Other users in the ecosystem (e.g., in the system 100) can check the authentication token of the user to verify that the user is actually who the user claims to be. For example, a checking user can use a public key of the user providing the authentication token to verify the authentication token.

After verification, the account address can be tied to the users' the unique identifier, and the account address become a verified address. In some implementations, the information associated with verified address is recorded in the blockchain 116 for later obtaining by the platform device 104 or another component of the system 100. In some implementations, a user provides a unique identifier, authentication token, and account address to the blockchain 116. Other users of the blockchain 116 can check the authentication token to verify that the user is actually who they claim to be.

In some implementations, users are incentivized to check authentication tokens of other users. For example, devices of the blockchain 116 can provide a user that performs a check on an authentication token a portion of the stakes, such as Bitcoin, Ether, or other forms of cryptocurrency or traditional fiat currency, such as the U.S. dollar. A check can result in a checking user providing a vote, either confirming or not confirming the authentication token is valid, to one or more other devices of the blockchain 116. Votes can be added to one or more blocks of the blockchain 116.

After a stopping condition is met, such as an amount of time being reached, a threshold number of votes being recorded, or after a number of blocks of the blockchain 116 have been created since the user provided the authentication token for checking, the one or more devices of the blockchain 116, or an automated process, such as a smart contract, or the like, can identify a number of votes for confirming the authentication token or not confirming the authentication token. Based on the number of votes, the one or more devices of the blockchain 116 can either verify or not verify the address associated with the user providing the authentication token. For example, if there were over 1000 votes and the ratio of yes to no votes is at least 95%, then the blockchain network, operated by the one or more devices of the blockchain 116, can verify the address.

In some implementations, if a user fails to get his or her address authenticated, the user can try providing his or her authentication token and identifying information again. For example, if the user lacked the minimum number of votes or they did not get a high enough pass ratio, the user can receive a notification, or lack of a notification, that indicates the authentication was unsuccessful. The user can then provide, e.g., a unique identifier, authentication token, and account address in another attempt to authenticate.

In some implementations, authentication tokens are permanent. In some implementations, authentication tokens are generated periodically and expire after an amount of time or a condition is satisfied. For example, the platform device 104 can generate an authentication token for the user device 106. The platform device 104 can configure the token to expire according to expiring conditions, such as after a certain amount of time or a number of uses of the token. In general, any expiring condition can be set by the platform device 104. The user device 106 can obtain the generated authentication token and provide it to the blockchain 116, in part, to verify an identity of a user of the user device 106. As described herein, the user device 106 can become verified using the authentication token.

In some implementations, an output address 120 is generated. The output address 120 can be a random address, for example, generated based on an algorithm (e.g., a hash or other cryptographic) with randomization. The output address 120 is independent from any user or entity that participates in or is affiliated with the group task so as to prevent anyone that has a stake in the group task from changing the data stored in the output address 120. For example, the output address 120 can be an account address (e.g., an account or wallet address) on the blockchain 116 that is not owned or controlled by any user of the user devices 106, 108, and 110, the platform device 104, or the controlling device 114. In some implementations, none of the user of the user devices 106, 108, and 110, the platform device 104, or the controlling device 114 has a private key corresponding to the output address 120 and thus cannot change the data stored in the output address 120.

In some implementations, the storage device 118 represents a computer device that physically stores the data recorded in the output address 120. For example, the storage device 118 can be a blockchain node device of the blockchain 116. In some implementations, the storage device 118 can be an off-chain device and can provide data corresponding to the output address 120 to the blockchain 116. Devices of the blockchain 116 can retrieve, receive or otherwise obtain data from the output address 120.

In some implementations, the output address 120 is generated by the platform device 104. In some implementations, the output address 120 is generated by a node (e.g., a mining node) of the blockchain 116. For example, a mining node of the blockchain that mines a block that includes the start-task transaction 112 can perform one or more operations based on the start-task transaction 112 to generate an output address 120. As one example, the one or more operations can include hashing some or all of the content of the start-task transaction 112 to generate a result and generating the output address 120 based on the result (e.g., the result or its variant can be selected as the output address 120). As another example, the one or more operations can include hashing a data item that includes the start-task transaction 112 to generate a result, and generating the output address 120 based on the result. As yet another example, the one or more operations can include generating a nonce value, hashing a data item that includes the start-task transaction 112 and a nonce, and generating the output address 120 based on the result. Additional or different operations can be performed, for example, by the platform device 104 or the blockchain 116 to generate the output address 120.

In some implementations, the node (e.g., the mining node) of the blockchain 116 installs code before performing one or more operations on the start-task transaction 112. For example, a mining node that mines a block that includes the start-task transaction 112 can perform one or more operations specified within the code that is installed before mining a block that includes the start-task transaction 112. The one or more operations can include the one or more operations based on the start-task transaction 112 to generate the output address 120. In some implementations, the code can be include in a smart contract that is deployed on the node of the blockchain 116.

In some implementations, the platform device 104 selects a controlling device. For example, the platform device 104 can select the controlling device 114. The controlling device 114 can be a device of an officiator of the group task. An officiator can be a third party that serves as a judge, notary, referee, scorekeeper, or another role to enhance the fairness of the task. In some implementations, the Officiator connects to the task with the users and keeps a record of scores and metrics, for example, using an offline side chain. The platform device 104 can select the controlling device 114 from a set of verified addresses. The controlling device 114 can be associated with a verified address within a set of verified addresses. The verified addresses can be verified by one or more blockchain node devices of the blockchain 116. The controlling device 114 can provide information to the blockchain 116 in order to become verified by one or more blockchain node devices of the blockchain 116.

As shown in the example of FIG. 1, the controlling device 114 connects to the platform 102. The controlling device 114 obtains task data 122 from the user devices 106, 108, and 110. In some implementations, using the controlling device 114 increases efficiency of the group task. For example, the controlling device 114 can consolidate a recording of the group task which can be checked by the users in the group task, for example, after the task is complete. By using the controlling device 114, the users of the user devices 106, 108, and 110 can engage in the group task without interruption or stop to ensure the accuracy of the recording of the action taken in completing the group task. For example, the controlling device 114 can create a record of the group task that includes each action taken by each of the users of the user devices 106, 108, and 110 during the group task. The controlling device 114 can store the record, for example, in real time, and upload or send the record, or otherwise allow the users to check the record during or after the group task, without requiring the users to confirm that the users agree on actions that have taken place in the group task during the group task.

After the beginning of the task, and the sending of the start-task transaction 112 to the blockchain 116, the user devices 106, 108, and 110 engage in the task. For example, the task can include drafting a legal document, playing an online game, finalizing plans, drafting legislation, among others. In some implementations, the task is collaborative in that multiple users are engaged in completing the task. In some implementations, the task is competitive in that multiple users compete with each other in completing the task (e.g., completing the task with the shortest amount of time or highest score). The task is completed according to the task parameters 111. As the user devices 106, 108, and 110 engage in actions to complete the task, they generate task data 122.

In some implementations, task data 122 can include a record of events. For example, the task data 122 can include a first action performed by the user device 106 at a particular time. The task data 122 can include a second action performed by the user device 108 at another time. The task data 122 can include statistics such as point values, progress, status for each user of the user devices 106, 108, and 110 with respective to the task.

In some implementations, in stage B, the controlling device 114 obtains the task data 122 from one or more of the user devices 106, 108, and 110. For example, each of the user devices 106, 108, and 110 can provide data to one another, either directly, or through the platform device 104. Each of the user devices 106, 108, and 110 can similarly provide data to the controlling device 114, either directly, or through the platform device 104. In some implementations, the controlling device 114 is connected with the user devices 106, 108, and 110 during the group task. The controlling device 114 can record the task data 122 representing events in the completion of the group task by the user devices 106, 108, and 110.

In some implementations, in stage B, the platform device 104 provides the task data 122 to the controlling device 114. The controlling device 114 can use the side chain 124 to store the task data 122. In some implementations, the side chain is another blockchain that can store data related to the task. In some implementations, the controlling device 114 generates the side chain 124 to store the task data 122. In some implementations, the controlling device 114 accesses the side chain 124 stored on another device. Blocks 124*a-d* are example blocks in the side chain 124. In some implementations, each block of the blocks 124*a-d* of the side chain 124 can include a portion of the task data 122 as the task progresses. For example, a new block can be created each increment of time. In some implementations, a new block is created after a new block forming threshold is satisfied. For example, when the storage limit for a block is reached, a new block is generated. Each block, similar to the blockchain 116, can include a hash of the previous blocks contents. The first block can include a root hash. The controlling device 114 sends the task data 122 as the task progresses and stores the task data 122 in the blocks 124*a-d*.

In some implementations, one or more users of the user devices 106, 108, and 110 signs each block 124*a-d* of the side chain 124. For example, during performance of the task, the users of the user devices 106, 108, and 110 can obtain data of the side chain 124 and confirm or deny the data is a correct record of the task being performed. If a user determines the record is correct, the user can sign the block. After a task is completed and each block signed by users of the user devices 106, 108, and 110, the controlling device 114 can include some or all of the side chain data in an end-task transaction 128 to the output address 120.

In some implementations, the controlling device 114 signs each block of the side chain 124. In some implementations, it is advantageous to have only the controlling device 114 sign blocks of the side chain 124. For example, one issue, in a scenario without the controlling device 114 signing the blocks and users of the user devices 106, 108, and 110 signing each block of the side chain 124, is that if even one user disagrees on the data, such as scores or other record, of a given block, the task could come to a halt. In some implementations, the task is halted by the platform device 104 if there is a disagreement among users of the user devices 106, 108, and 110 based on the record of the side chain 124.

Another issue can result based on the susceptibility of blockchain consensus to at 51% attack. When a blockchain network has a large number (e.g., millions) of users, this attack becomes difficult, even impractical, to achieve. When a blockchain network contains just a few people, such as users of the user devices 106, 108, and 110, this attack becomes a more serious threat. For example, a majority of users of the user devices 106, 108, and 110 could "bully" the minority into signing off on fraudulent record data, or a single user could hold all other players hostage by not signing on a given block.

Users in these scenarios can risk losing the potential stakes that come with participating in the task and might succumb to signing the fraudulent scores of the majority. The controlling device 114 can be used to prevent such cases and ensure a degree of fairness.

In some implementations, the user or administrator of the controlling device 114 (e.g., the officiator) is not known to the users of the user devices 106, 108, and 110. In some implementations, the officiator does not have a direct stake, other than a potential stake in being a controlling device, in the task being performed by the users of the user devices 106, 108, and 110. In this way, the officiator can be an unknown and unbiased third party. The controlling device 114 can keep track of all the metrics of the task being completed by the users of the user devices 106, 108, and 110. If a majority of users are trying to generate fraudulent data for a given task, the controlling device 114 can prevent the fraudulent data from changing the record of the side chain 124.

In some implementations, the controlling device 114 can record bad behavior, such as coercion among users, or fraudulent activity, to the platform device 104 or the blockchain 116. If a user is recorded as being coercive or engaging in fraudulent activity during the performance of a task, the user can be banned or have stakes removed from corresponding account addresses.

The controlling device 114 provides some or all of task data stored on the side chain 124 to the output address 120. In some implementations, the controlling device 114 signs the side chain data. For example, the controlling device 114 can sign side chain data with a private key of the controlling device 114 to generate an end-task transaction 128. The end-task transaction 128 can include the some or all of task data stored in the side chain 124. The end-task transaction 128 can be authenticated by using a public key of the controlling device 114.

In stage C, the side chain data 132 are recorded in the blockchain 116. In some implementations, the storage device 118 is a blockchain node device of the blockchain 116. For example, the storage device 118 can include one or more computing elements similar to the platform device 104, user devices 106, 108, and 110, and the controlling device 114. The storage device 118 can include side chain data 132, including the end-task transaction 128 in a block of the blockchain 116 stored locally. The side chain data 132 can include data associated with departure (referred to as departure data 126) as well as data associated with dispute (referred to as dispute data 130).

During the task, users of the user devices 106, 108, and 110 may leave the platform 102. For example, a connection can be dropped or a user can choose to stop participating in the task. In some implementations, a user device sends a signal indicating a departure to the platform device 104. The platform device 104 can send the departure data to the blockchain 116 where the departure is recorded in the blockchain 116 corresponding to the output address 120. In some implementations, a user device directly sends data indicating a departure to be stored on the blockchain 116. For example, the user device 108 can send the departure data 126 to the output address 120. In some implementations, the user device 108 can send the departure data 126 to the storage device 118. The storage device 118 can be a node in the blockchain 116. The storage device 118, or another node in the blockchain 116, can write the departure data 126 in the blockchain 116 corresponding to the output address 120.

In some implementations, writing data in the blockchain corresponding to the output address 120 can include writing a transaction that assigns data to a particular account address indicated by the output address 120. In some implementations, the output address 120 is not an account address of any user participating in or affiliated with the group task and thus no user owns a private key to change the data associated with the output address 120. However, the address can be used to store data of the group task, such as the side chain data 132.

In some implementations, the dispute data 130 indicates a user is dissenting with the record of the end-task transaction 128. For example, the user device 110 can send the dispute data 130 to the platform device 104. For example, the dispute data 130 can indicate that the user of the user device 110 dissents with the record of the end-task transaction 128. The dispute data 130 can indicate one or more errors with the end-task transaction 128. The dispute data 130 can indicate a complete dissent with the entire end-task transaction 128.

In some implementations, a user device sends a signal indicating a dispute, such as the dispute data 130, to the platform device 104. The platform device 104 can send the dispute data 130 to the blockchain 116 where the dispute is recorded in the blockchain 116 corresponding to the output address 120. In some implementations, a user device directly sends data indicating a dispute to be stored on the blockchain 116. For example, the user device 108 can send dispute data 130 to the output address 120. In some implementations, the user device 108 can send the dispute data 130 to the storage device 118. The storage device 118 can be a node in the blockchain 116. The storage device 118, or another node in the blockchain 116, can write the dispute data 130 in the blockchain 116 corresponding to the output address 120.

In some implementations, the number of disputes a user can submit is limited. For example, in order to prevent over-disputing, the platform device 104, or one or more devices operating the blockchain 116, can track a number of disputes for each user of the user devices 106, 108, and 110. In some implementations, a number of disputes for each user is tracked in the blockchain 116. When a user submits dispute data to the blockchain, one or more other blockchain users can check the blockchain 116 to determine whether or not the number of disputes the user has submitted is within a threshold number of disputes. In some implementations, in order for a dispute to be written to the blockchain 116, a node of the blockchain checks a current total number of disputes for the user and determine that the current total number of disputes for the user satisfies one or more criteria, such as below a dispute total threshold.

When the platform device 104 receives a dispute from a user, it can obtain one or more values from storage indicating a current total of disputes filed by the given user. In some implementations, the one or more values are stored in the blockchain 116. If the current total satisfies a threshold criteria, the platform device 104 can record the dispute on the output address 120.

In some implementations, after an amount of time or action by the platform device 104 or user, a given user's dispute count is reset. For example, after a month, a dispute count can be reset. This can be a tunable or otherwise configurable parameter of the platform 102 to prevent users from filing frivolous or fraudulent disputes while enabling users to file a sufficient number of legitimate disputes.

In some implementations, if a threshold number of users file a dispute on a given record, the dispute is not added to a current total of disputes for the users. For example, if more than a threshold percentage of users on the platform 102 file disputes for the record provided by the controlling device 114, the dispute can be considered legitimate. In some implementations, if the dispute is considered legitimate, dispute counts are not increased. For example, a user can file more than a certain threshold of disputes provided at least one of the disputes is considered a legitimate dispute.

In some implementations, the controlling device 114 provides a stake before becoming the controlling device 114. For example, the controlling device 114 can provide a portion of a digital currency, such as Bitcoin, Ether, or the like. The controlling device 114 can provide a portion of other forms of fiat currency such as U.S. dollars, or another type of assets. The controlling device 114 can provide the stake through a currency exchange system. After providing stake, the controlling device 114 can monitor one or more group tasks, such as the group task shown in FIG. 1, passively or actively, and keep track of relevant task statistics. The controlling device 114 can store a record for each of the one or more group tasks. For example, the controlling device 114 can record the task data 122 and data indicating a task completion in the side chain 124.

In some implementations, a stake provided by the controlling device 114 is used as collateral. For example, if a threshold number of disputes are received for one or more records provided by the controlling device 114, a stake provided by the controlling device 114 can be removed from a verified address of the controlling device 114. In some implementations, a threshold number of disputes for a particular record, such as the end-task transaction 128, is sufficient to cause the controlling device 114 to lose its stake. In some implementations, repeated disputes filed for the same controlling device 114 causes the controlling device 114 to lose its stake.

In some implementations, disputes are recorded in the blockchain 116. For example, the side chain data 132 obtained from the output address 120 can include the dispute data 130. The side chain data 132 can be added to one or more blocks of the blockchain 116. The one or more devices implementing the blockchain 116, or one or more automated processes, such as smart contracts or the like, can identify one or more disputes recorded in the blockchain 116. As described herein, the number of disputes can be recorded for users of the user devices 106, 108, and 110 as well as controlling devices, such as the controlling device 114.

In some implementations, one or more devices implementing the blockchain 116, or one or more automated processes, such as smart contracts or the like, removes a stake corresponding to a controlling device. For example, after the side chain data 132, including the end-task transaction 128, the dispute data 130, and the departure data 126, is recorded in the blockchain 116, one or more devices implementing the blockchain 116, or one or more automated processes, such as smart contracts or the like can access an account address corresponding to the controlling device 114 and remove a portion of assets from the address. In some implementations, removing a portion of assets includes reducing a value corresponding to one or more assets.

In some implementations, after a controlling device loses stake, they are banned from being a controlling device again. For example, if the controlling device 114 loses its stake provided to be a controlling device for the platform 102, one or more devices of the blockchain 116 can record a transaction in the blockchain 116 indicating that the controlling device 114 is banned from being a controlling device. In some implementations, the platform device 102 obtains a list of banned devices corresponding to banned addresses before selecting a controlling device for recording operations of a task. For example, the platform device 102 can obtain a set of verified addresses and a set of banned addresses and determine an address based on comparing the verified address and the set of banned addresses that is not banned but is verified to be the address of the controlling device.

In some implementations, one or more devices implementing the blockchain 116, or one or more automated processes, such as smart contracts or the like, provide rewards to one or more of the user devices 106, 108, and 110. For example, based on the side chain data 132, rewards are calculated for each user of the user devices 106 and 110. Because the user of the user device 108 departed the platform 102 before the end of the task, the user can be removed from the reward pool. In this way, users are incentivized to complete more tasks and not depart after partially contributing.

In some implementations, rewards are provided by one or more devices implementing the blockchain 116 or one or more automated processes, such as smart contracts or the like. For example, rewards can be provided based on the side chain data 132. In some implementations, rewards correspond to adjustable ratios. For example, in a competitive task, such as a game, winners can be given greater rewards than losers or spectators. In some implementations, rewards correspond to the duration of a task. For example, tasks that take longer to complete can generate larger rewards for participants. In this way, users are not simply motivated to finish as many tasks as possible but, rather, to spend time participating in tasks.

In a collaborative task, such as legal document management or planning, among others, rewards can be constant for each participate. In some implementations, users that perform more actions are provided more reward. For example, in a collaborative task, a user that provides more comments, feedback, edits, among other data, can be rewarded more than a user that provides less data. In general, reward ratios can be tuned according to implementation. Reward ratios can serve as a means to control the incentives of the task. If the incentives are to keep users playing a game, a ratio that rewards winners more than losers might be effective at incentivizing engagement. If the incentives are to have users complete tasks, a reward ratio that rewards participants only if they complete the task may be effective.

In some implementations, rewards are adjusted over time. For example, if inflation is a concern for a given implementation, the reward ratio can be adjusted to reduce rewards over time. If greater engagement in tasks is desired for a particular period of time, rewards can be increased. In general, the rewards can be controlled by components of the system 100. In some implementations, the platform device 104 provides data indicating a reward ratio to the blockchain 116. For example, the reward ratio can be written in a smart contract. The smart contract can then be executed to allocate rewards to addresses corresponding to users, such as the users of the user devices 106, 108, and 110, after a task is completed.

In some implementations, the task is a multiplayer video game. For example, the users of the user devices 106, 108, and 110 can play a video game on a gaming platform 102 connecting the users. After completing a game, the users can receive rewards for their time spent playing the game, as described herein.

In some implementations, a multiplayer video game task includes matchmaking, matches, and results based on the matches. For example, matchmaking can include logging a user into a platform (e.g., platform 102) such as XBOX or STEAM, among other gaming distribution providers. The platform can provide a framework for finding other players. In some cases, players may find other players by directly communicating, such as through a peer to peer connection or other type of connection. Found players can be joined in a lobby by the platform before starting a match. The players can agree on parameters for the match, such as game type, as well as specific features of the task. In a game context, specific features may include starting resources, build deposit, build refund, gravity, teams, among others. An officiator can be automatically selected, such as by a process of the platform or by a type of random or pseudo-random selection. After players agree on the parameters, the game can begin and statistics for the game can be recorded, for example, as described in FIG. 1, by the selected officiator which may be referred to as a controlling device, such as the controlling device 114.

During or after a match, players can upload specific data to an output address (e.g., the output address 120). For example, players that agree to parameters of a match in a matchmaking lobby, and then start a game, can each provide data indicating features of the game. Features can include reports of cheating, software bugs, dissents as to the recording performed by the controlling user, among others. In some implementations, a graphical user interface (GUI) is provided on a user device to provide a user an ability to provide data in portions of a form or another presentation. The data can then be included in a data package and stored in a blockchain corresponding to the output address.

After a match is completed, a controlling device can automatically submit all relevant stored data from captured statistics of the match to the output address, such as the output address 120. Players, including players that played in the match, can view final scores and data relevant to the match. Once the controlling device's transaction is written to the output address, the blockchain network automatically mints coin (e.g., as a type of rewards) to users. As discussed in connection with FIGS. 1-3, the coin minted to users depends on the statistics recorded by the controlling device. In some implementations, users that perform a task better or spend more time on a task receive more minted coin than users that perform a task worse or spend less time on a task. In general, a system, such as the system 100, can use any suitable logic, which may vary over time, to allocate minted coin to players of a match or users that collective perform a task.

Advantageous implementations can include one or more of the following features. For example, platforms can efficiently generate records of task performance and incentivize completion of tasks, as well as time spent completing tasks, by users. Reward ratios can be used to correctly incentivize users. Unlike traditional mining techniques such as PoS and PoW that rewards only one user that participate in mining, the described PoP techniques allow rewarding more than one user and thus incentivize more users to participate in completing the tasks. Moreover, the described PoP techniques can save energy and time in compared to conventional mining techniques. For example, implementations with side chaining and a selected controlling device can be used to improve efficiency of recording details of the completion of a task. Time and energy can be saved compared to directly submitting data to be recorded in the blockchain. Furthermore, attack vectors and fraudulent behavior can be prevented by requiring verified addresses of users on the platform and selecting the controlling device based on an identified verified address and corresponding stake provided by the selected controlling device. Other advantages can include the ability for the system 100 to record group tasks in a decentralized way as described herein.

In some implementations, only users with verified addresses can participate in PoP. Participating in PoP can include being a user, such as the users of the user devices 106, 108, and 110, as well as being an officiator of a controlling device, such as the controlling device 114.

In some implementations, there is a minimum time between start and end-task transactions. For example, the minimum can be set by a developer, recorded in the blockchain 116, or determined by the platform device 104. Minimum time can be represented in time units (e.g., seconds, minutes) or number of generated blocks of the blockchain 116 or the side chain 124. End-task transactions indicating a task end time not conforming to the minimum time (e.g., less than the minimum time or less than or equal to the minimum time) can be identified by an automated process or the platform device 104. Corresponding tasks can be invalidated or corresponding rewards reduced, according to implementation.

In some implementations, controlling devices only are controlling devices for one task at a time. In some implementations, a controlling device cannot be a controlling device for another task until the controlling device posts the previous end-task transaction for the previous task.

In some implementations, users complete one task at a time. For example, a user must complete a first task before starting a second task. In some implementations, users start new tasks before a controlling device records an end-task transaction in the blockchain 116. For example, the user may have departed from the platform 102 or specific task and wants to start a new task. The controlling device can be delayed in posting the end-task transaction or may not post the end-task transaction at all. In general, the system 100 can be configured to not delay or inhibit users from completing new tasks. The platform device 104, or one or more devices of the blockchain 116, can allow users to start a new task or receive rewards for new tasks.

In some implementations, if an end-task transaction that includes a particular user is posted by a controlling device indicating a time when a task is complete, and that time is after a time of a new start-task transaction including the particular user, the particular user is kicked out of a current task or docked assets. For example, the platform 102, the platform device 104, or code run by a device of the blockchain 116, such as a smart contract, can determine that the particular user started a task before completing another task. The platform device 104, or automated code, such as a smart contract, can be configured to identify the records on the blockchain 116 and ban users or remove assets, according to implementation. This incentivizes users from joining a large number of tasks without actually contributing or being attentive.

In some implementations, there is a threshold number of tasks a user is allowed to engage in before being banned or otherwise disincentivized. For example, a user on a given platform can multi-task to a certain degree, e.g., be engaged in a threshold number of tasks, beyond which the user is likely using bots or other mechanisms designed to exploit the PoP operation.

Figure 2:
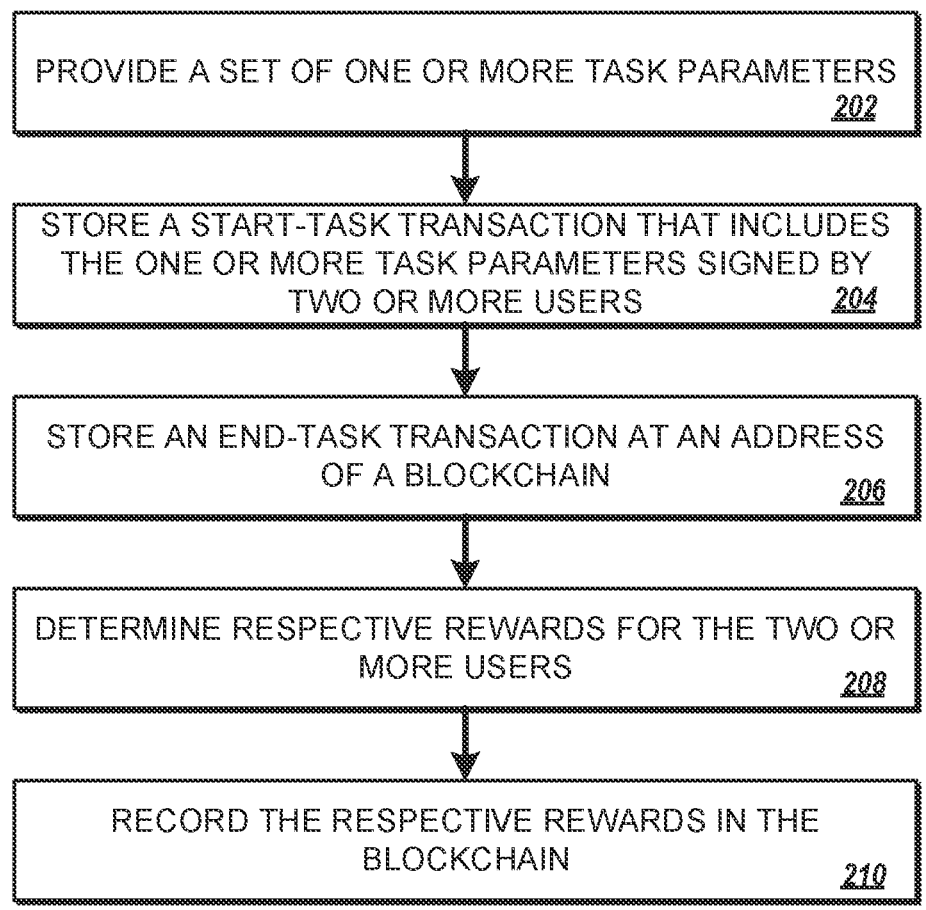
FIG. 2 is a flow diagram illustrating an example of a process for allocating rewards based on group participation in a task.

FIG. 2 is a flowchart illustrating an example of a process 200 for allocating rewards based on group participation in a task. The process 200 may be performed by one or more electronic systems, for example, the system 100 of FIG. 1.

The process 200 includes providing a set of one or more task parameters (202). For example, each of the user devices 106, 108, and 110 can perform consensus on the one or more task parameters 111 as well as the participants of the task, such as the user devices 106, 108, and 110. In some implementations, the platform 104 provides the task parameters 111 to each of the user devices 106, 108, and 110. In some implementations, each of the user devices 106, 108, and 110 provide the task parameters 111 to each other.

The process 200 includes storing a start-task transaction that includes the one or more task parameters signed by two or more users (204). For example, responsive to a consensus among two or more users, such as the user devices 106, 108, and 110, the system 100 can store a start-task transaction that includes the set of one or more task parameters, e.g., task parameters 111. The task parameters can be signed by each of two or more users, e.g., the user devices 106, 108, and 110, in accordance with a cryptographic process. In some implementations, storing the start-task transaction 112 includes sending the start-task transaction 112 to a mining node of the blockchain 116 to write the start-task transaction 112 into a ledger of the blockchain 116.

The process 200 includes storing an end-task transaction at an address of a blockchain (206). For example, the system 100 can store the end-task transaction 128 at the output address 120. In some implementations, the output address 120 is an account address (e.g., an account or wallet address) on the blockchain 116 that is not owned or controlled by any user of the user devices 106, 108, and 110, the platform device 104, or the controlling device 114. The end-task transaction 128 can include data corresponding to the task data 122 including data associated with actions taken during execution of the task by two or more users, e.g., users of the user devices 106, 108, and 110 or the user devices 106, 108, and 110.

The process 200 includes determining respective rewards for the two or more users (208). For example, the system 100 can determine a reward for the user corresponding to the user device 106, a reward for the user corresponding to the user device 108, and a reward for the user corresponding to the user device 110 based on the start-task transaction 112 and the end-task transaction 128. In some implementations, the system 100, including one or more nodes of the blockchain 116, determines a reward for one or more users of the user devices 106, 108, and 110 based on the task data 122. In some implementations, a winner of the task shown in FIG. 1, or a user that performed the most operations or most quality operations, is given greater rewards than other users.

The process 200 includes recording the respective rewards in the blockchain (210). For example, a node of the blockchain 116 can include a transaction allocating an amount of a currency to one or more of the accounts associated with the user devices 106, 108, 110. The node can include the transaction in a block of the blockchain 116. Based on the operation of the blockchain 116, the accounts associated with the user devices 106, 08, and 110 can be adjusted according to the determined respective rewards for each corresponding user.

Figure 3:
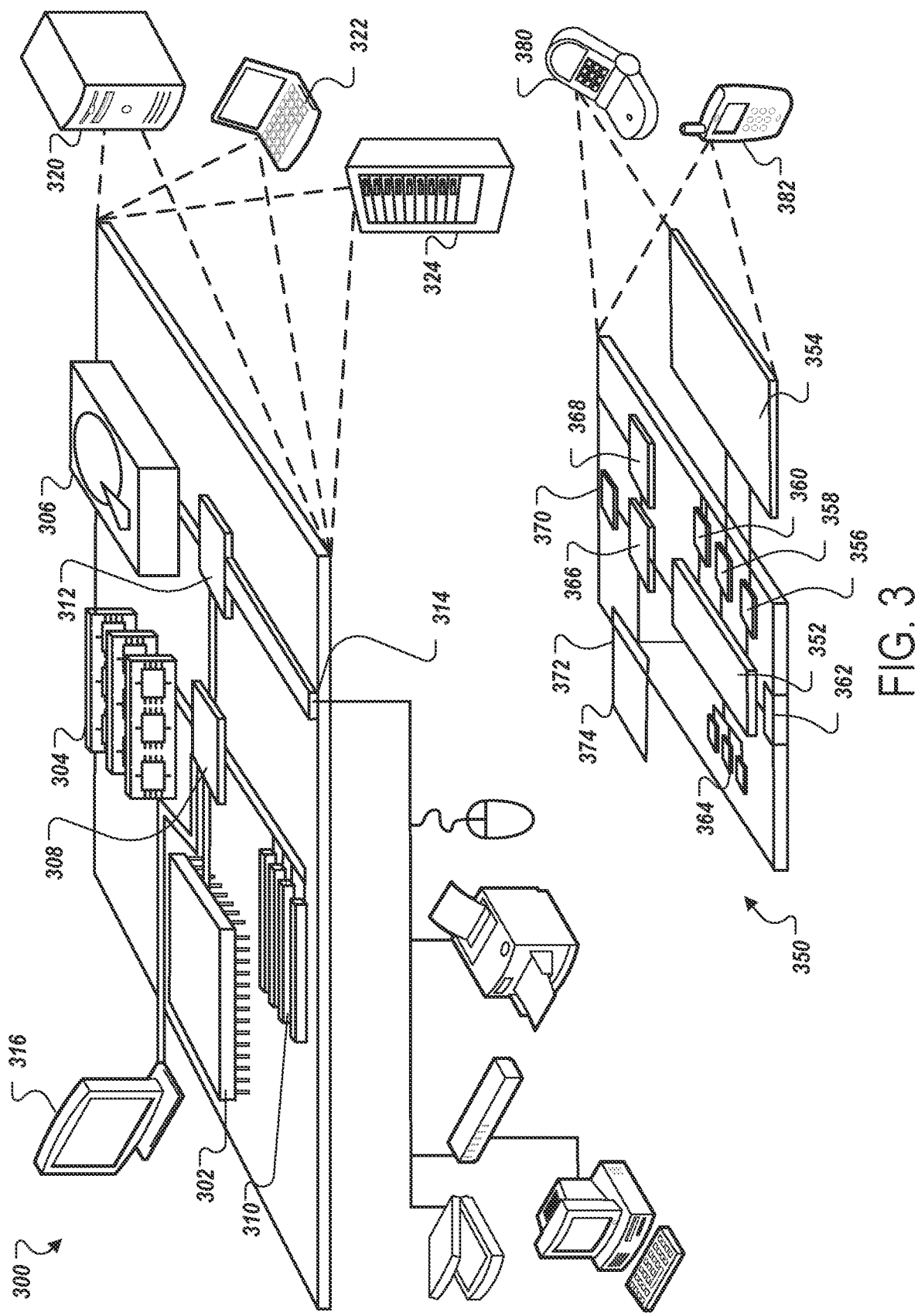
FIG. 3 is a diagram illustrating an example of a computing system used for allocating rewards based on group participation in a task.

FIG. 3 is a diagram illustrating an example of a computing system used for allocating rewards based on group participation in a task. The computing system includes computing device 300 and a mobile computing device 350 that can be used to implement the techniques described herein. For example, one or more components of the system 100 could be an example of the computing device 300 or the mobile computing device 350, such as a computer system, including one or more computing instances, implementing one or more of the storage device 118, the platform device 104, user devices 106, 108, and 110, and the controlling device 114

One or more components of the system 100 could be an example of the computing device 300 or the mobile computing device 350, such as a computer system, including one or more computing instances, implementing devices that access information from one or more of the storage device 118, the platform device 104, user devices 106, 108, and 110, and the controlling device 114.

One or more components of the system 100 could be an example of the computing device 300 or the mobile computing device 350, such as a computer system, including one or more computing instances, implementing one or more servers that access or store information regarding the operations performed by one or more of the storage device 118, the platform device 104, user devices 106, 108, and 110, and the controlling device 114.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 302 is a single threaded processor. In some implementations, the processor 302 is a multi-threaded processor. In some implementations, the processor 302 is a quantum computer.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine readable mediums (for example, the memory 304, the storage device 306, or memory on the processor 302). The high-speed interface 308 manages bandwidth-intensive operations for the computing device 300, while the low-speed interface 312 manages lower bandwidth-intensive operations. Such allocation of functions is an example only. In some implementations, the high speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may include one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry in some cases. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 368 using a radio frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, among others) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments described herein and all of the functional operations described in this specification can be implemented in digital electronic circuitry, or in computer software, firmware, or hardware, including the structures disclosed in this specification and their structural equivalents, or in combinations of one or more of them. Embodiments described in the application can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described in the application can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments described in the application can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments described in the application, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the application or of what may be claimed, but rather as descriptions of features specific to particular embodiments described in the application. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A method comprising:
   obtaining a start-task transaction that includes a set of one or more task parameters signed by each of two or more user devices in accordance with a cryptographic process;
   generating a signed start-task transaction by cryptographically signing the start-task transaction with a private key of a controlling device, the signed start-task transaction comprising an address of a blockchain;
   transmitting the signed start-task transaction to one or more blockchain node devices of the blockchain;
   using a side blockchain to record actions taken during execution of a group task by the two or more user devices;
   generating an end-task transaction using the side blockchain, wherein the end-task transaction is stored at the address of the blockchain that is independent from the two or more user devices, wherein the end-task transaction comprises data indicating the actions taken during execution of the group task by the two or more user devices; and transmitting the end-task transaction to the one or more blockchain node devices, wherein the end-task transaction is configured to generate one or more transactions in the blockchain indicating rewards for one or more of the controlling device or the two or more user devices.

2. The method of claim 1, comprising:
generating a stake reward transaction comprising an address of the controlling device; and
transmitting the stake reward transaction to the one or more blockchain node devices of the blockchain, wherein the stake reward transaction is configured to transfer value from the address of the controlling device to the blockchain.

3. The method of claim 1, wherein portions of the side blockchain are cryptographically signed by one or more of the two or more user devices, and wherein portions of the side blockchain that are not cryptographically signed by a user device of the two or more user devices
indicate disputes associated with actions taken by the controlling device.

4. The method of claim 3, wherein the disputes satisfy a threshold, the method comprising:
removing a stake reward submitted by the controlling device.

5. The method of claim 1, wherein the address of the blockchain included in the signed start-task transaction is randomly generated.

6. The method of claim 1, wherein (i) the address of the blockchain included in the signed start-task transaction is not an account address corresponding to any of the two or more user devices or the controlling device and (ii) none of the two or more user devices or the controlling device stores a private key configured to change the data associated with the address of the blockchain.

7. The method of claim 1, comprising:
generating a stake reward request transaction comprising an address of the controlling device; and
transmitting the stake reward request transaction to the one or more blockchain node devices of the blockchain, wherein the stake reward request transaction is configured to transfer value from the blockchain to the address of the controlling device.

8. The method of claim 7, wherein the value transferred from the blockchain to the address of the controlling device comprises minted coin.

9. The method of claim 1, wherein generating the one or more transactions in the blockchain indicating rewards for one or more of the controlling device or the two or more user devices comprises:
generating, using a smart contract stored on the blockchain and data stored in the blockchain, the one or more transactions in the blockchain indicating rewards for one or more of the controlling device or the two or more user devices.

10. The method of claim 1, wherein the address of the blockchain represents an account address on the blockchain.

11. The method of claim 1, wherein the address of the blockchain is determined by a node of the blockchain based on a hash value of the start-task transaction.

12. The method of claim 1, comprising:
generating a connected group of the two or more user devices for completing the group task through an online service.

13. The method of claim 1, comprising:
prior to obtaining the start-task transaction, providing information to the blockchain configured to verify the controlling device, wherein the information comprises (i) a unique identifier of the controlling device, (ii) an authentication token, and (iii) an account address of the controlling device.

14. The method of claim 1, wherein generating the one or more transactions in the blockchain indicating rewards for one or more of the controlling device or the two or more user devices comprises:
determining respective rewards for at least two of the two or more user devices based at least on time that the at least two of the two or more user devices spent on the group task.

15. The method of claim 1, comprising:
obtaining the set of one or more task parameters; and
generating a signed set of one or more task parameters by cryptographically signing the set of one or more task parameters.

16. The method of claim 1, wherein generating the side blockchain to record the actions taken during execution of the group task by the two or more user devices comprises:
providing data indicating the actions taken during execution of the group task by the two or more user devices to a device communicably connected to the controlling device.

17. The method of claim 1, wherein actions taken during execution of the group task by the two or more user devices include virtual actions taken by the two or more user devices within a virtual game environment.

18. A non-transitory, computer-readable medium storing one or more instructions executable by a computer system to perform operations comprising:
obtaining a start-task transaction that includes a set of one or more task parameters signed by each of two or more user devices in accordance with a cryptographic process;
generating a signed start-task transaction by cryptographically signing the start-task transaction with a private key of a controlling device, the signed start-task transaction comprising an address of a blockchain;
transmitting the signed start-task transaction to one or more blockchain node devices of the blockchain;
using a side blockchain to record actions taken during execution of a group task by the two or more user devices;
generating an end-task transaction using the side blockchain, wherein the end-task transaction is stored at the address of the blockchain that is independent from the two or more user devices, wherein the end-task transaction comprises data indicating the actions taken during execution of the group task by the two or more user devices; and
transmitting the end-task transaction to the one or more blockchain node devices, wherein the end-task transaction is configured to generate one or more transactions in the blockchain indicating rewards for one or more of the controlling device or the two or more user devices.

19. The non-transitory, computer-readable medium of claim 18, the operations comprising:
generating a stake reward transaction comprising an address of the controlling device; and transmitting the stake reward transaction to the one or more blockchain node devices of the blockchain, wherein the stake reward transaction is configured to transfer value from the address of the controlling device to the blockchain.

20. The non-transitory, computer-readable medium of claim 18, wherein portions of the side blockchain are cryptographically signed by one or more of the two or more user devices, and wherein portions of the side blockchain that are not cryptographically signed by a user device of the two or more user devices
   indicate disputes associated with actions taken by the controlling device.

21. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      obtaining a start-task transaction that includes a set of one or more task parameters signed by each of two or more user devices in accordance with a cryptographic process;
      generating a signed start-task transaction by cryptographically signing the start-task transaction with a private key of a controlling device, the signed start-task transaction comprising an address of a blockchain;
      transmitting the signed start-task transaction to one or more blockchain node devices of the blockchain;
      using a side blockchain to record actions taken during execution of a group task by the two or more user devices;
      generating an end-task transaction using the side blockchain, wherein the end-task transaction is stored at the address of the blockchain that is independent from the two or more user devices, wherein the end-task transaction comprises data indicating the actions taken during execution of the group task by the two or more user devices; and
      transmitting the end-task transaction to the one or more blockchain node devices, wherein the end-task transaction is configured to generate one or more transactions in the blockchain indicating rewards for one or more of the controlling device or the two or more user devices.

\* \* \* \* \*